United States Patent
Vranish

(10) Patent No.: US 6,626,792 B2
(45) Date of Patent: Sep. 30, 2003

(54) GEAR BEARINGS

(75) Inventor: John M. Vranish, Crofton, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/799,872

(22) Filed: Mar. 3, 2001

(65) Prior Publication Data

US 2002/0031288 A1 Mar. 14, 2002

Related U.S. Application Data

(60) Provisional application No. 60/175,545, filed on Mar. 7, 2000.

(51) Int. Cl.[7] .................................................. F16H 1/28
(52) U.S. Cl. .................... 475/331; 74/462; 74/665 GA; 384/550; 475/344
(58) Field of Search .............................. 475/331, 335, 475/342, 348, 329, 344, 330, 338, 904, 180, 179, 176, 177, 332; 74/665 H, 665 S, 665 T, 665 K, 665 N, 665 GA, 665 C, 640, 460; 384/550, 554, 548

(56) References Cited

U.S. PATENT DOCUMENTS

| | | | | |
|---|---|---|---|---|
| 3,602,070 A | * | 8/1971 | Verge et al. ................... | 74/804 |
| 3,789,700 A | * | 2/1974 | Cotreau et al. ................ | 74/640 |
| 3,998,506 A | * | 12/1976 | Traut | |
| 4,106,361 A | * | 8/1978 | Burtis .......................... | 74/462 |
| 4,132,131 A | * | 1/1979 | DeBruyne | |
| 4,136,580 A | * | 1/1979 | Brand et al. ................... | 74/410 |
| 4,629,340 A | * | 12/1986 | Provost et al. .............. | 384/554 |
| 4,864,893 A | * | 9/1989 | Hori ............................. | 74/460 |
| 4,942,781 A | * | 7/1990 | Hori ........................... | 475/462 |
| 5,018,402 A | | 5/1991 | Roerig et al. | |
| 5,554,082 A | * | 9/1996 | Umeyama et al. .......... | 475/338 |
| 5,680,836 A | * | 10/1997 | Pierik | |
| 5,685,797 A | * | 11/1997 | Barnsby et al. ............. | 475/331 |
| 6,295,885 B1 | * | 10/2001 | Delsole | |
| 6,402,656 B1 | * | 6/2002 | Peralta | |

OTHER PUBLICATIONS

"The Anatomy of Precision", Bayside Controls Catalog, Circle 158.

* cited by examiner

Primary Examiner—Douglas C. Butler
(74) Attorney, Agent, or Firm—Keith L. Dixon

(57) ABSTRACT

A gear bearing having a first gear and a second gear, each having a plurality of teeth. Each gear operates on two non-parallel surfaces of the opposing gear teeth to perform both gear and bearing functions simultaneously. The gears are moving at substantially the same speed at their contact points. The gears may be roller gear bearings or phase-shifted gear bearings, and may be arranged in a planet/sun system or used as a transmission.

14 Claims, 12 Drawing Sheets

PHASE-SHIFTED GEAR BEARINGS
(RING GEARS)

GEAR BEARINGS

This application claims the benefit of U.S. provisional application Ser. No. 60/187,545 filed Mar. 7, 2000.

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention relates to a gear bearing having components that perform gear and bearing functions in a single component using two non-parallel surfaces simultaneously.

2. Description of the Related Art

A first known planetary gear system uses helical planetary gears with two sets of ball bearings and drives its output off a carrier. In driving off the carrier, mechanical advantage and efficiency are sacrificed. The two sets of ball bearings locate and stabilize the operation of the gears. This arrangement takes up space and the interfaces make for a weaker system. By using two, or even one separate bearing, separate interfaces require a separate attachment/detachment means which tends to rattle and is so flexible that the structure is weakened.

A second known design involves harmonic drives. Harmonic drives come in two main types, a pancake type (short axial length) and a cup type (with a larger axial length). Harmonic drives operate by means of a wave generator which rotates and, in so doing, periodically pushes a flexible spline (with teeth) radially outward in two diametrically opposite places. As the spline deflects outwards, its teeth push against the sides of the teeth of the output ring, causing the output ring to move to one side. As the wave generator turns, the points of the flexible spline turn with it, and the output ring moves with it also. There is generally one less tooth in the output ring than in the flex spline, so as the flex spline makes a complete cycle, the output ring rotates a total width of two teeth. The pancake version is not as easy to lubricate and is not as efficient as the cup type, though they are more compact. The cup type is more efficient but is not as compact. Both types are expensive and structurally weak, and the flexible splines tend to fail due to stripping.

A third known design is disclosed in U.S. Pat. No. 5,409,431, involving Carrier-Less, Anti-Backlash Planetary Drive System (Apr. 25, 1995, by John M. Vranish). This system requires a spring loading which complicates the design and makes the system too large. Furthermore, anti-backlash is not frequently needed and is very expensive.

SUMMARY OF THE INVENTION

Accordingly, it is an object of the present invention to provide a gear bearing system that overcomes the above disadvantages of the known designs.

It is a further object of the present invention to provide a gear bearing system that results in a high mechanical advantage.

It is yet another object of the present invention to provide a gear bearing system that has improved efficiency, strength and structural rigidity.

It is still another object of the present invention to provide a gear bearing system that has a simpler construction and lower parts count.

It is another object of the present invention to provide a gear bearing system that is superior in bearing strength.

It is another object of the present invention to provide a gear bearing system in which it is easy to assemble, locate and stabilize gear systems.

It is still another object of the present invention to provide a gear bearing system common to both the electric motor drive in order to allow the armature and stator to function properly, and to provide a high mechanical advantage output.

A fourth embodiment of the present invention includes a system including a component that performs both gear and bearing functions in a single component using two or more orthogonal surfaces simultaneously. In a first embodiment, this system includes roller gear bearings, and in a second embodiment, this system includes phase-shifted gear bearings. In a third embodiment, the bearings are helical.

The foregoing objects of the invention are further achieved by a fixed ratio transmission based on gear bearings.

The foregoing objects of the invention may also be achieved by a gear bearing system comprising a first gear having a plurality of first gear teeth comprising a first plurality of contact points, each of said first plurality of contact points moving at a first speed, and a second gear having a second plurality of gear teeth comprising a second plurality of contact points, each of said second plurality of contact points moving at a second speed. The first plurality of contact points and second plurality of contact points are in contact with each other and the first speed is substantially the same as the second speed.

The foregoing objects of the invention are still further achieved by a gear bearing system comprising a first gear having a plurality first gear teeth, each of the first gear teeth having a first surface and a second surface, and a second gear operating on the first surface and second surface of the first gear teeth.

Additional objects and advantages of the invention will be set forth in part in the description which follows, and, in part, will be obvious from the description, or may be learned from practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
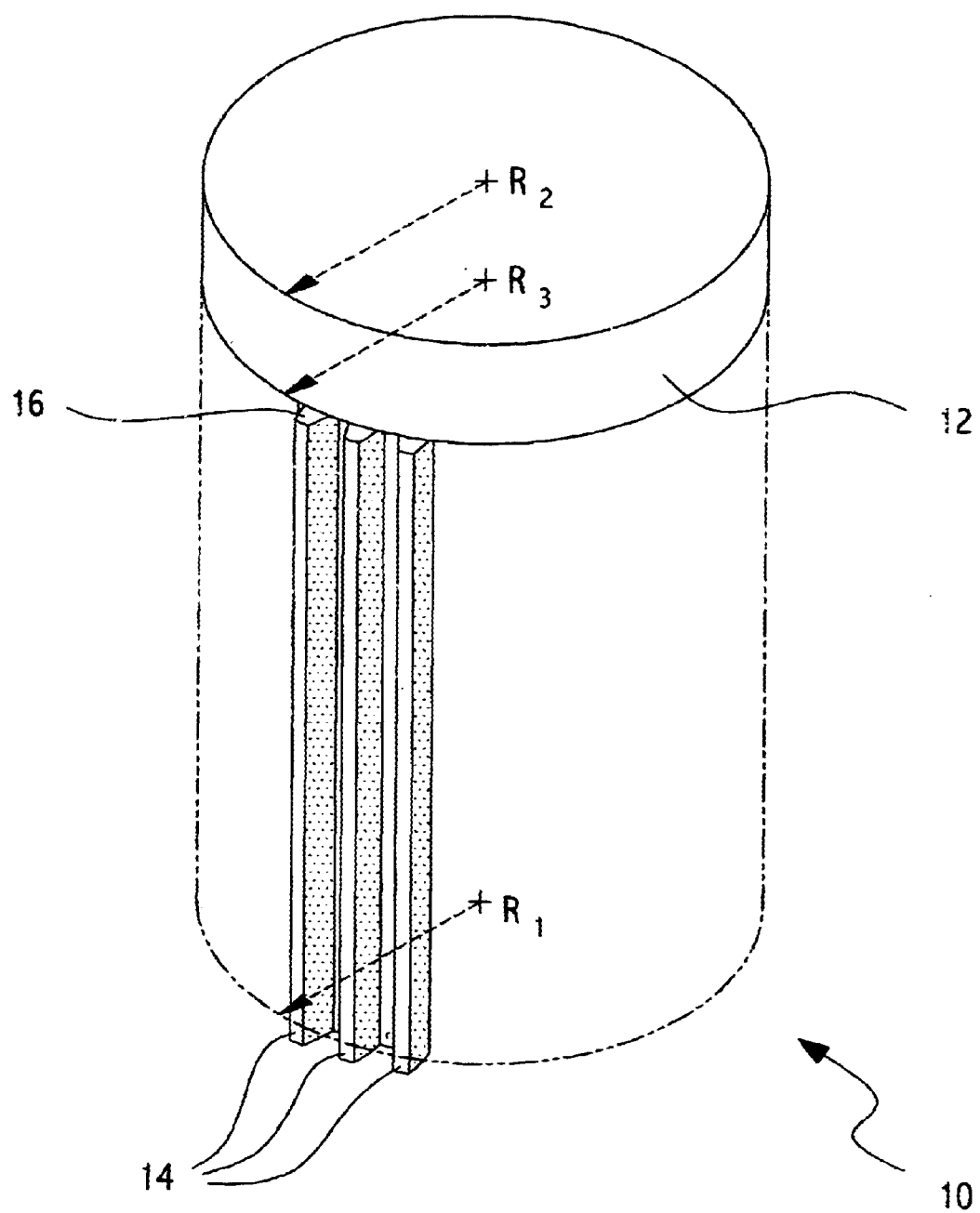
FIG. 1 is a perspective view of a spur gear as used in a first embodiment of the present invention.

Reference will now be made in detail to the present preferred embodiments of the present invention, examples of which are illustrated in the accompanying drawings, wherein like reference numerals refer to like elements throughout.

As illustrated in FIGS. 1, 2 and 3, a first embodiment of the present invention relates to spur roller gear bearings. Referring to FIG. 1, spur roller gear bearings consist of a spur gear 10 which has a roller 12 coaxially mounted on its top. Spur gear teeth 14 extend radially from spur gear 10, and have a pitch radius R1. The radius of the roller $R_2$ is equal to the pitch radius $R_1$ of the spur gear teeth. The tops of the spur gear teeth 14 form a crown 16. The radius to the crown top $R_3$ is equal to the pitch radius and the roller radius. Since $R_1$, $R_2$ and $R_3$ are equal, the points at these radii move at the same speed.

Figure 2A:
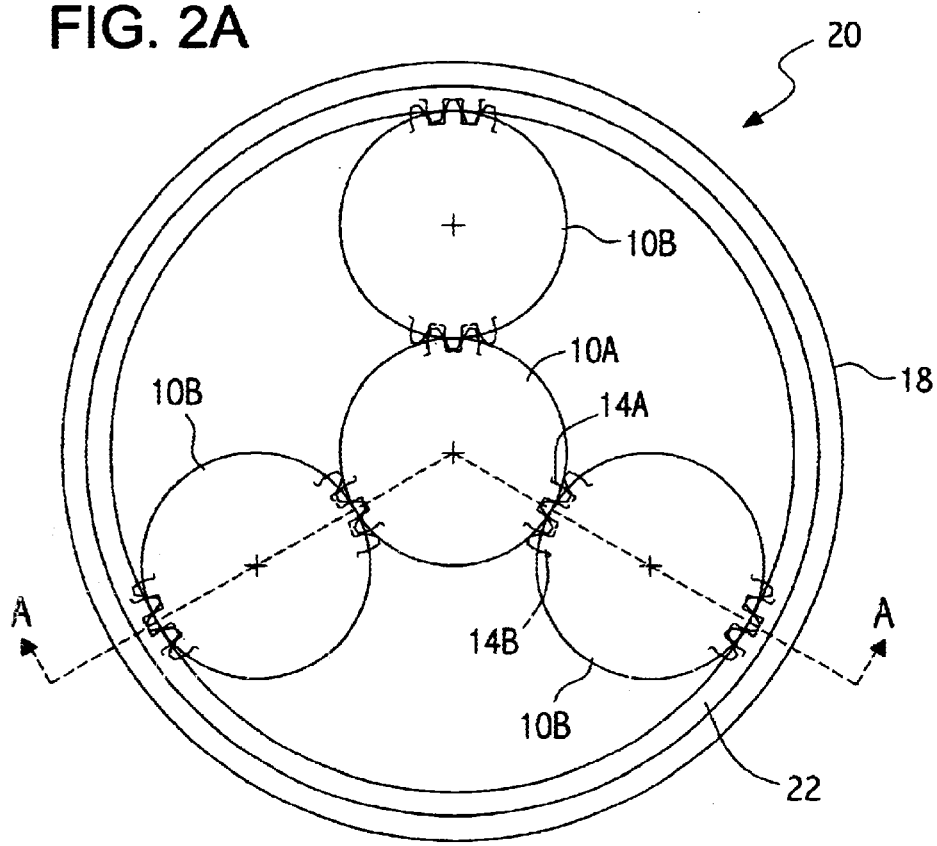
FIG. 2A is an overhead view of a planetary system using the spur gears of the first embodiment of the present invention.

Referring now to FIG. 2A, we see that spur gears 10 can be configured with a ring gear 18 formed of ring gear teeth 24 to form planetary system 20. Planet spur gears 10B revolve around sun spur gear 10A. Since spur gears 10A, B are identical in size, the speed at $R_1$, $R_2$, and $R_3$ is identical for each spur gear 10A, B. The crown 16 of each planet spur gear 10B interfaces with the roller 12 of a sun spur gear 10A, and vice versa. The teeth 14B of each planet gear 10B also interface with the teeth 14A of the sun gear 10A. Specifically, the teeth 14A, B contact each other at pitch radius R1.

Figure 2B:
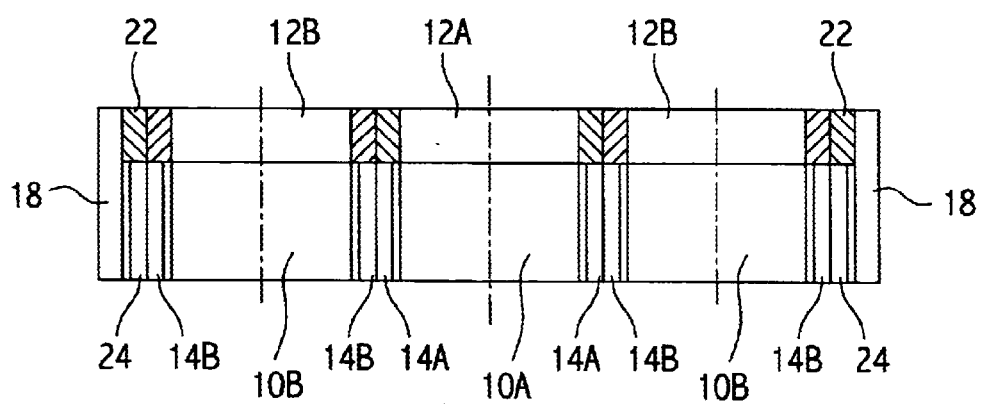
FIG. 2B is a cross-sectional view taken through line A—A of FIG. 2A.

Referring to FIG. 2B, which is a cross-section of the planetary system 20 of FIG. 2A, we see that a ring roller 22 is coaxially mounted on the top of the ring gear 18 such that the diameter of the ring roller 18 is set equal to the pitch diameter of the ring gear teeth 24. The tops of the ring gear teeth 24 are crowned at (not shown) the point where they interface with the spur gear teeth 14B.

This planetary system 20 is held together without further structures. As can be seen from FIGS. 2A and 2B, if a planet spur gear 10B is pushed down, its teeth 14B will slide with respect to ring gear 18 and the sun spur gear teeth 14A, but the planet spur gear roller 12B will be blocked by the upper surface of the ring gear teeth 24. If planet spur gear 10B is pushed upwards, the ring roller 22 will block the upper surface of the planet spur gear teeth 14B. If the sun spur gear 10A is pushed down, sun spur gear roller 12A will be blocked by the upper surface of each of the three planet spur gears 10B, so that the planet spur gears 10B will likewise be pushed down. However, planet spur gears 10B will each, in turn, be blocked by the ring gear 18 so, ultimately, the sun spur gear 10A cannot be pushed down. Likewise, the sun spur gear 10A cannot be pulled up.

Figure 3A:
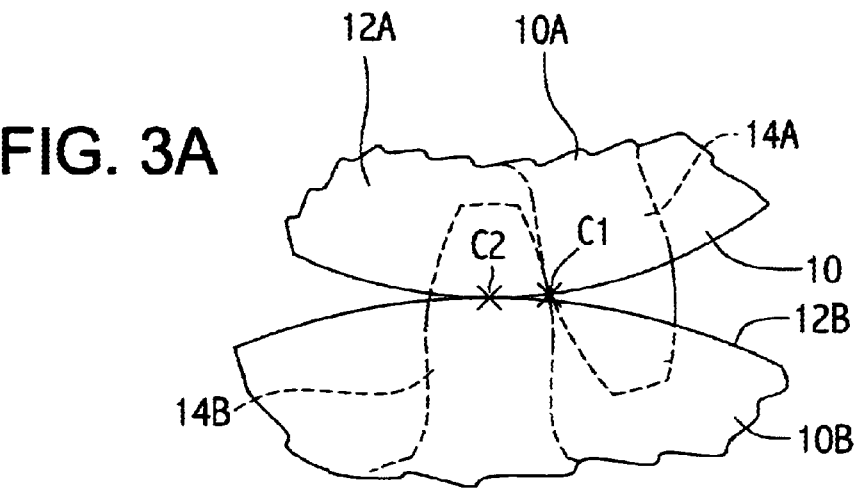
FIG. 3A is a partial top view of the spur gears of FIGS. 1 and 2 interacting.
Figure 3B:
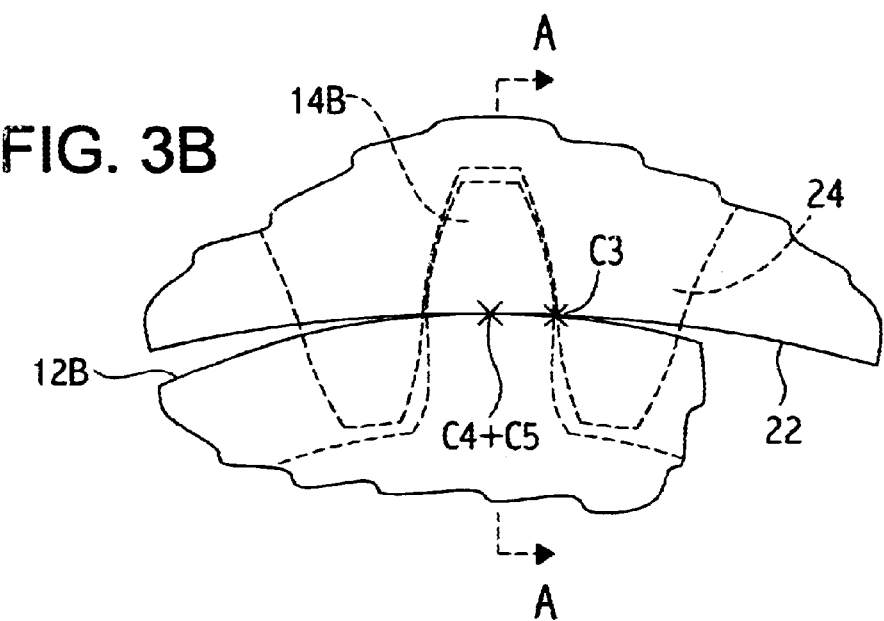
FIG. 3B is a partial top view of a spur gear interacting with a ring gear.
Figure 3C:
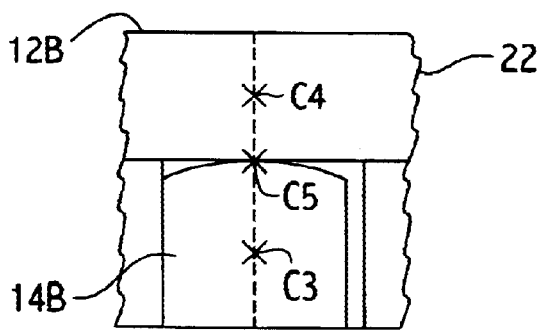
FIG. 3C is a sectional view taken through line A—A of FIG. 3B.

FIGS. 3A, 3B and 3C further illustrate how gears 10A, 10B, 18 interact with each other. FIG. 3A shows spur gears 10 interacting with other spur gears, illustrating the case where the sun spur gears 10A are interacting with the planet spur gears 10B. The teeth 14A of sun spur gear 10A contact the teeth 14B of planet spur gear 10B at point C1. The teeth 14B of planet spur gear 10B contact the roller 12A of sun spur gear 10A at point C2. FIG. 3B shows planet spur gears 10B interacting with ring gear 18. The ring gear teeth 24 contact the spur gear teeth 14B at point C3. FIGS. 3A and 3B show that the spur gear on spur gear case is essentially the same as the spur gear on ring gear case in terms of matching speeds for both the roll and gear surfaces. Spur roller 12B contacts ring roller 22 at point C4, and spur gear teeth 14B contact ring roller surface 22 at point C5. FIG. 3C shows that by crowning the tops of the spur gear 10 with the apogee of the crown 16 at the same radial distance as the roller and tooth pitch radii, ($R_1$, $R_2$) that thrust bearing contact must occur at the apogee point and so speed matching can be achieved for simultaneous and/or individual contacts between interfacing rollers, gear teeth and thrust bearing tooth tops/roller bottoms. This means, a planetary roller gear system will perform with great efficiency and strength. Furthermore, the addition of the rollers must, inevitably, greatly improve the accuracy with which the gears mesh. The rollers precisely set gear locations with respect to each other. On the other hand, the gears act as a highly efficient and precise caging/carrier mechanism for the rollers. The cumulative result is a superior system that is also very simple and low cost.

Figure 4:
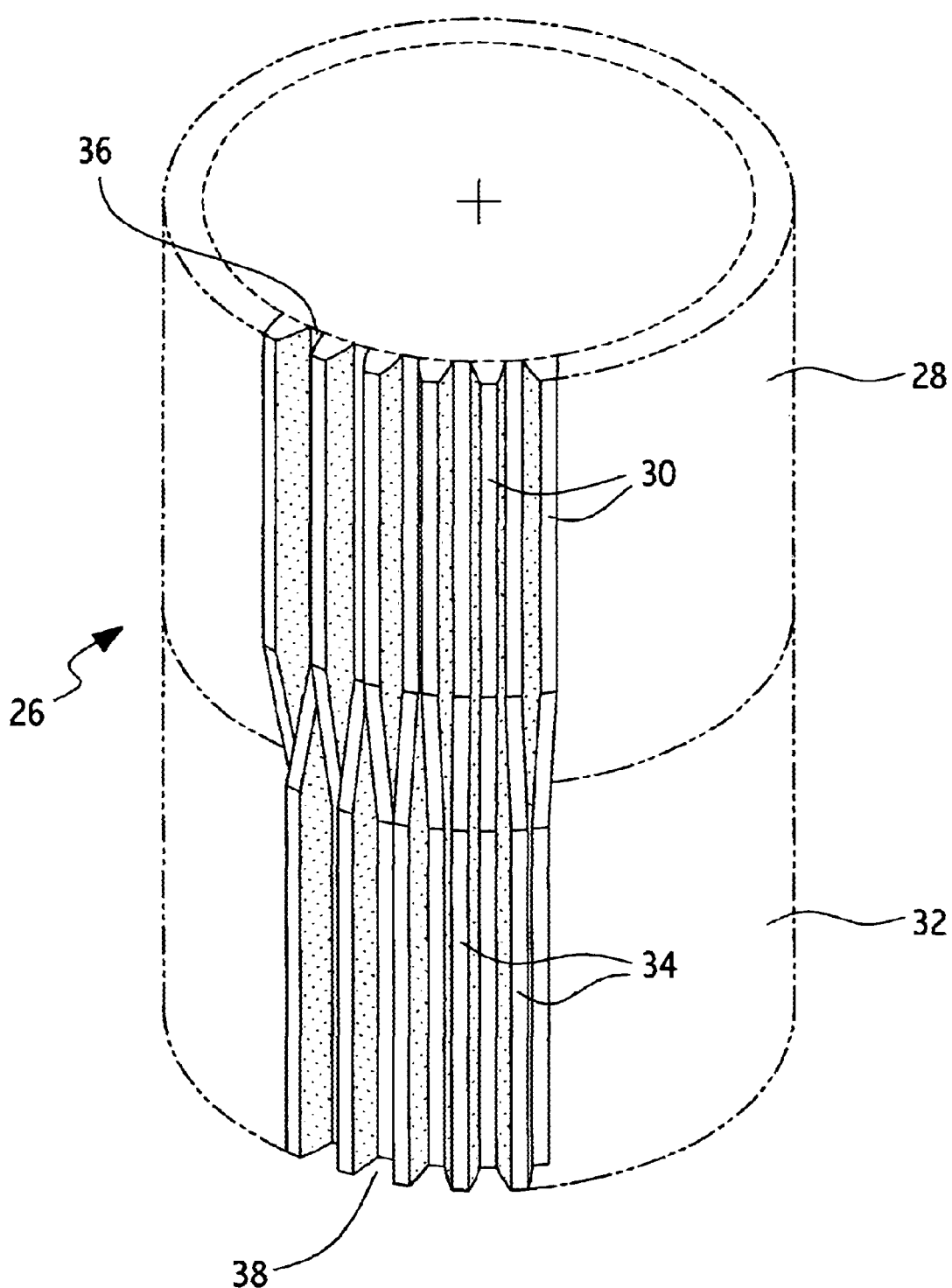
FIG. 4 is a perspective view of a phase-shifted gear bearing as used in a second embodiment of the present invention.

Turning now to FIGS. 4, 5 and 6, we discuss the second embodiment of the present invention, which involves phase-shifted gear bearings. FIG. 4 illustrates a phase-shifted spur gear 26 for use in phase-shifted gear bearings. Phase-shifted spur gear 26 includes an upper gear half 28 comprising upper gear teeth 30, and a lower gear half 32 comprising lower gear teeth 34. Upper gaps 36 and lower gaps 38 are formed between the gear teeth 32, 34. Upper gear half 28 is rotated with respect to lower gear half 32 so that the two halves are exactly out of phase with respect to each other. That is, upper gear teeth 30 are positioned above lower gaps 38, and lower gear teeth 34 are positioned below upper gaps 36. Thus, phase-shifted spur gear 26 could mesh with a phase-shifted gear just like it. As one gear turned and drove the other, both halves would be continuously contacting each other but, in different phases of contact. In FIG. 4, the lower gear teeth 34 are bevelled and extended slightly between the upper gear teeth 30. The upper gear teeth 30 are bevelled and slightly extended between the lower gear teeth 34 for both phase-shifted spur gears. Thus, the bevelled tooth surfaces contact each other much in the same manner as a four-way thrust bearing, and gear teeth 30, 34 contact each other and engage in conventional spur gear motion. The two motions can be timed so as to maximize efficiency, strength and smoothness.

Figure 5A:
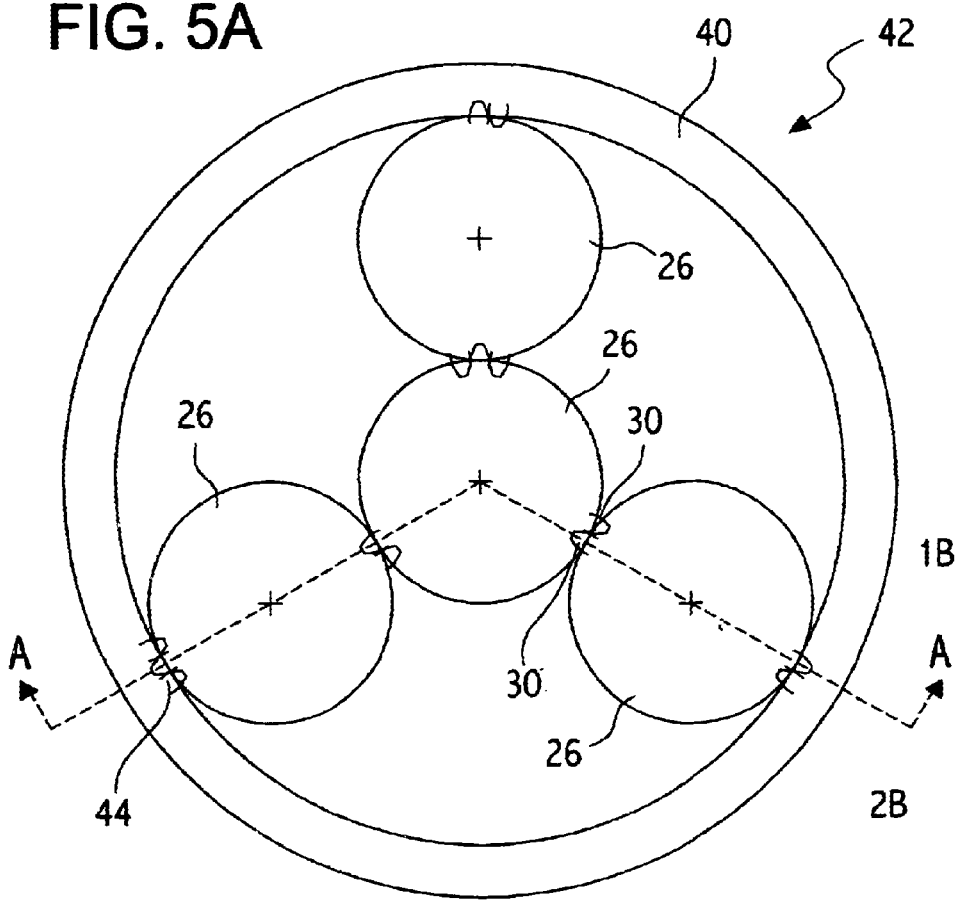
FIG. 5A is a top view of a planetary system utilizing the phase-shifted gear bearing of FIG. 4.
Figure 5B:
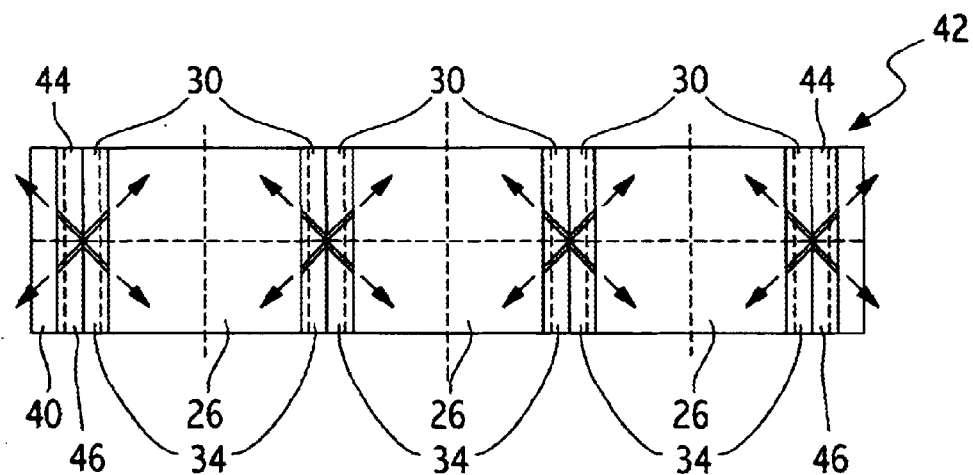
FIG. 5B is a cross-sectional view taken through line A—A of FIG. 5A.

Referring now to FIGS. 5A and 5B, we see that phase-shifted spur gears 26 can be configured with a ring gear 40, having upper ring gear teeth 44 and lower ring gear teeth 46, to form a planetary system 42, much like the system shown in FIGS. 2A and 2B. The planetary system 42 stays together in a similar manner to planetary system 20 of FIGS. 2A, 2B.

Figure 6A:
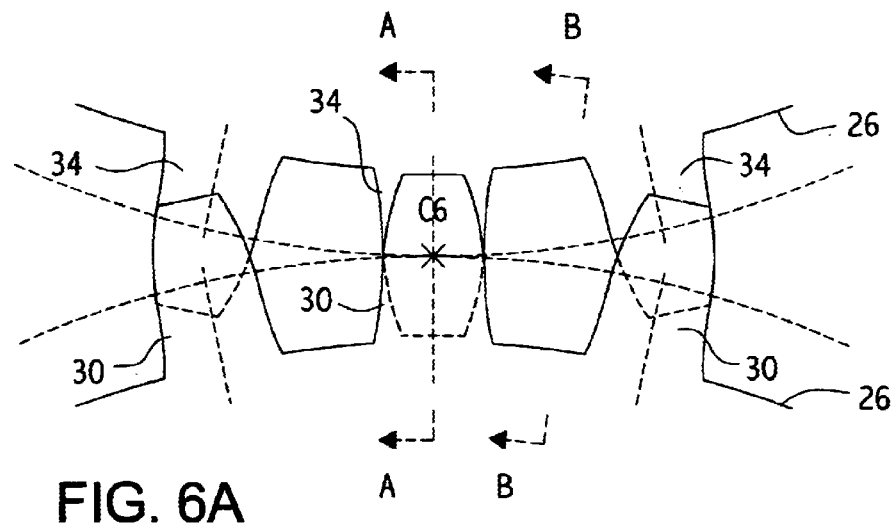
FIG. 6A is a partial top view illustrating the interaction of the phase-shifted gear bearings of FIG. 4.
Figures 6B, 6C, 6D:
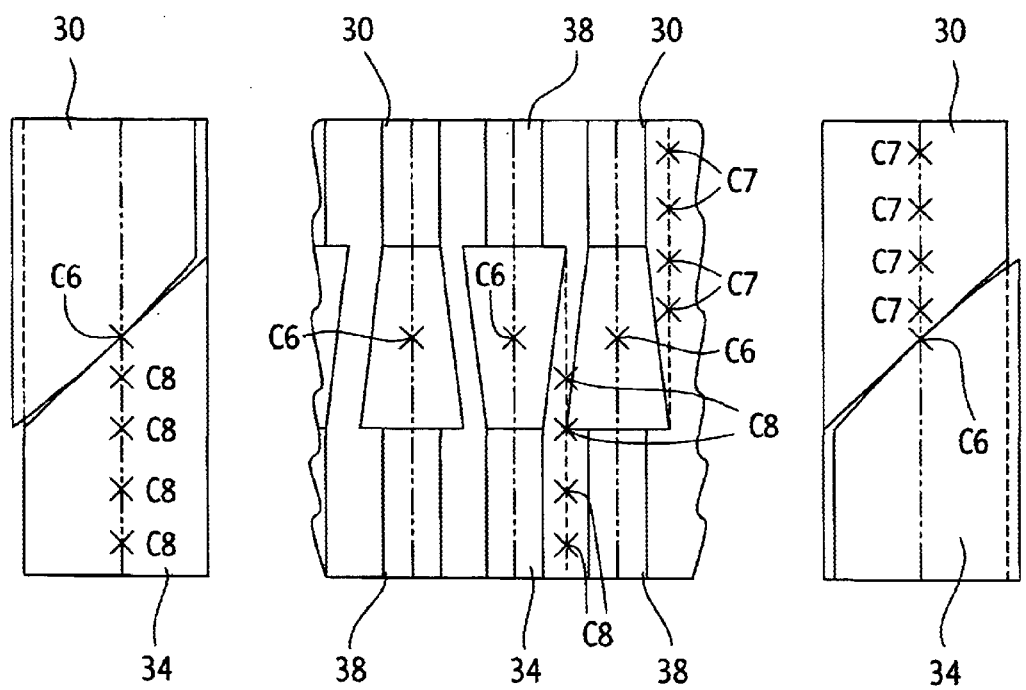
FIG. 6B is a sectional view taken through line A—A in FIG. 6A.
FIG. 6C is an edge view of FIG. 6A.
FIG. 6D is a sectional view taken through line B—B of FIG. 6A.

FIGS. 6A and 6B further illustrate how phase-shifted spur gears 26 interact with each other. FIG. 6A particularly illustrates upper gear teeth 30 of one phase-shifted spur gear 26 contacting lower gear teeth 34 of a second phase-shifted spur gear 26 at contact point C6. FIGS. 6B, 6C and 6D further illustrate contact points C7, where upper gear teeth 30 of the phase-shifted spur gears 26 contact; and contact points C8, where lower gear teeth 34 contact. FIG. 6C is an edge view of FIG. 6A.

Figure 7A:
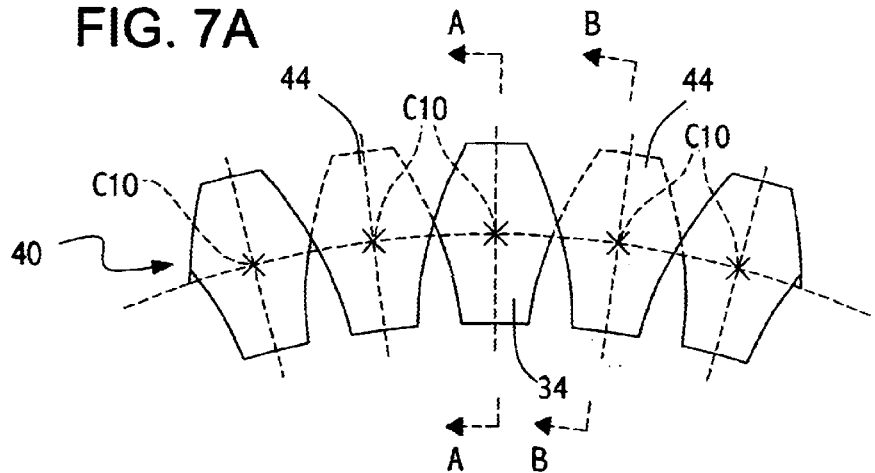
FIG. 7A is a partial top view illustrating the interaction of the phase-shifted spur gears and the ring gear of FIG. 4.
Figures 7B, 7C, 7D:
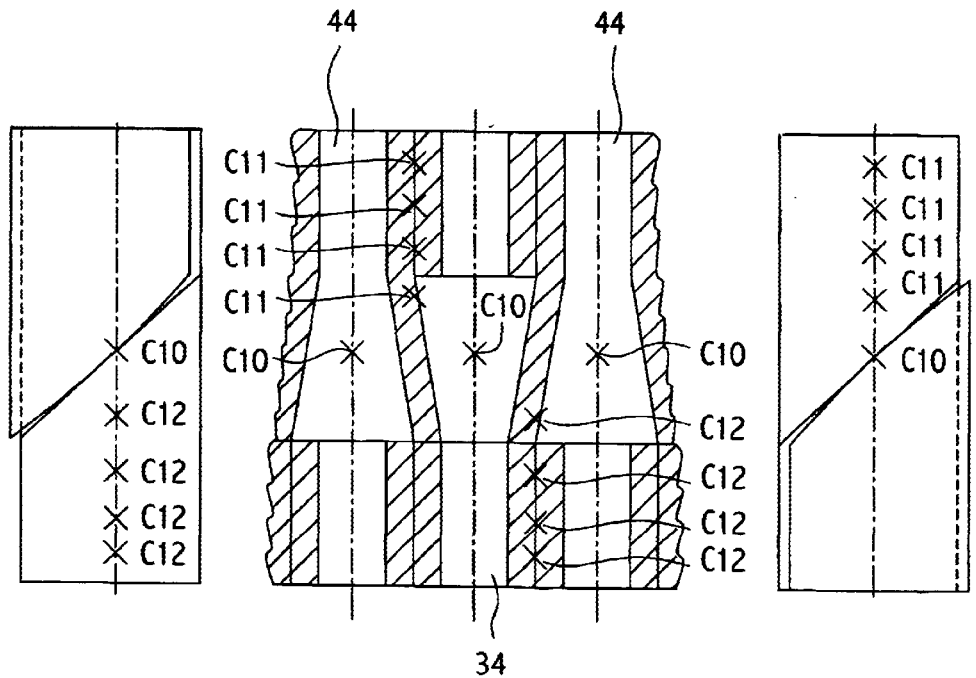
FIG. 7B is a sectional view taken through line A—A in FIG. 7A.
FIG. 7C is an edge view of FIG. 7A.
FIG. 7D is a sectional view taken through line B—B of FIG. 7A.

FIGS. 7A and 7B illustrate how phase-shifted spur gears 26 interact with ring gear 40. FIG. 7A particularly illustrates upper ring gear teeth 44 contacting lower gear teeth 34 of phase-shifted spur gear 26 at point C9. FIGS. 7B, 7C and 7D further illustrate contact points C10, where the upper gear teeth 30 of the spur gear contact the upper ring gear teeth 44; and contact points C11, where lower gear teeth 34 contact the lower ring gear teeth. (not shown)

Figure 8A:
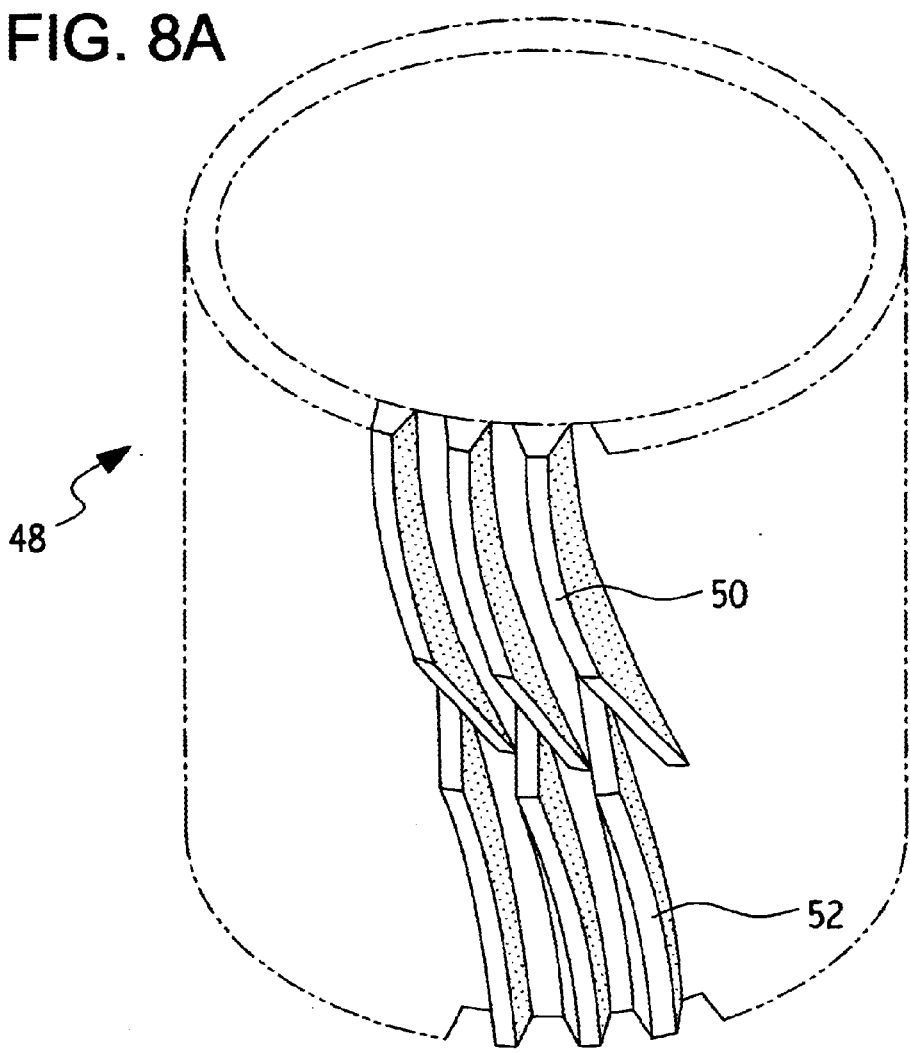
FIG. 8A is a perspective view of a helical phase-shifted spur gear as used in a third embodiment of the present invention.
Figure 8B:
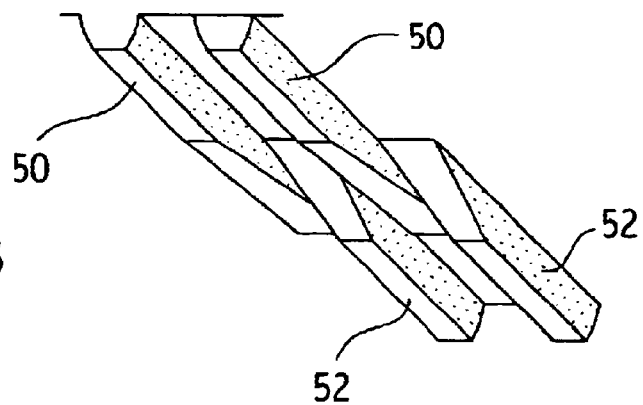
FIG. 8B illustrates a peeled open edge view of the teeth of the phase-shifted helical gear bearing of FIG. 8A.

FIGS. 8A and 8B illustrate the third embodiment of the present invention, namely, helical gear bearings, in which spur gear 26 is replaced by a helical (or herring bone) gear 48. The same timing issues and geometries that worked for the phase-shifted spur gear 26 apply in this embodiment. Although, FIGS. 8A and 8B show the case of phase-shifted helical gear bearings, a conventional roller gear bearing with helical teeth is also possible. FIG. 8B illustrates a peeled open edge view of upper helical teeth 50 and lower helical teeth 52.

Figure 9:
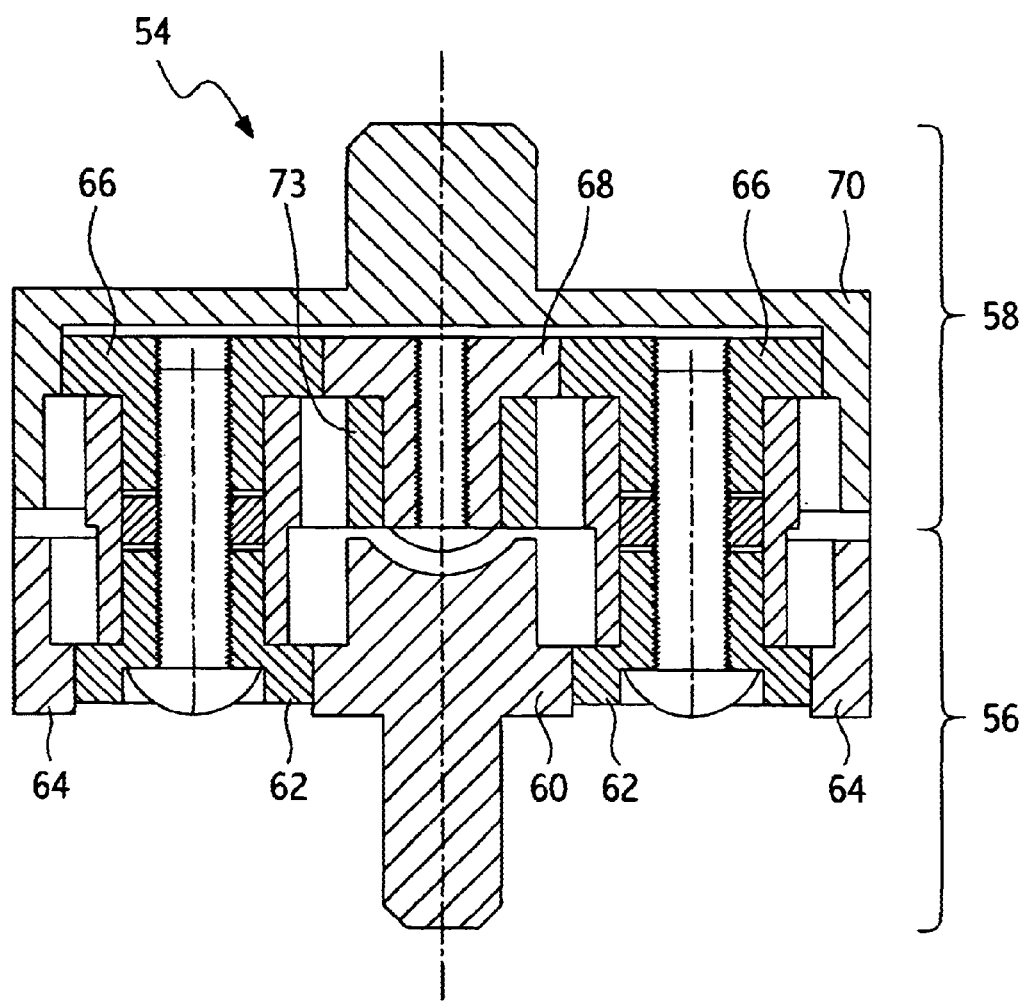
FIG. 9 is a sectional view of a planetary transmission featuring roller gear bearings according to the present invention.
Figure 10:
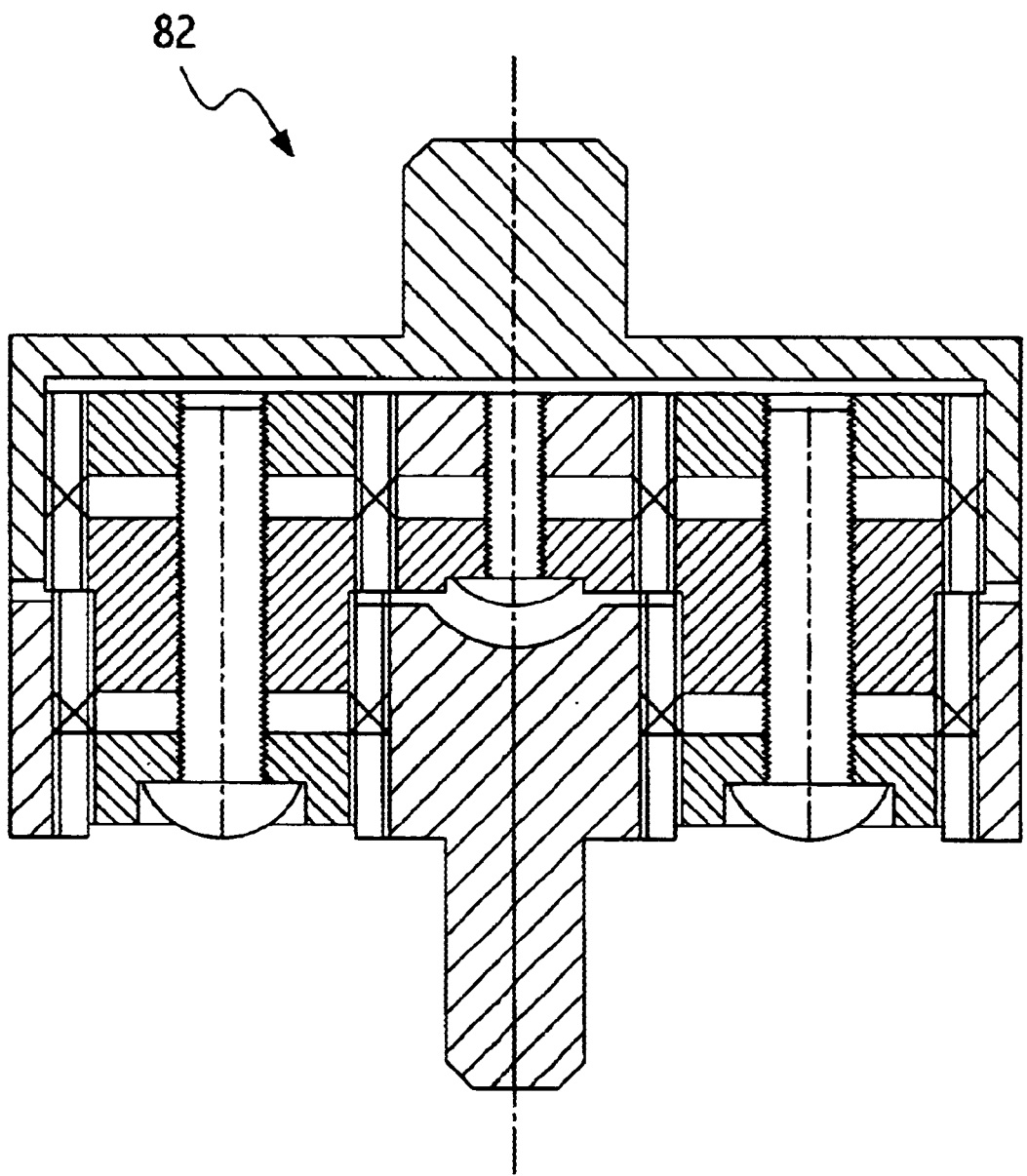
FIG. 10 is a sectional view of a planetary transmission using phase-shifted gear bearings according to the present invention.

The number of variations on the gear bearing arrangement of the present invention are endless, but only two will be discussed here. FIGS. 9 and 10 illustrate planetary transmissions using roller gear bearing and phase-shifted gear bearings, respectively. These planetary transmissions are fixed mechanical advantage transmissions which show great promise in being strong, compact, very efficient, carrierless, simple and capable of great speed reduction. The two concepts are functionally very similar, thus the explanation for roller gear bearings can easily be extended to the phase-shifted case.

The roller gear bearing planetary transmission generally operates as follows. The transmission 54 comprises an input system 56 and an output system 58. Input system 56 comprises input sun roller gear 60, input roller gear planets 62 and ground ring roller gear 64. Output system 58 comprises output roller gear planets 66, output roller gear sun 68 and output ring roller gear 70. The planets 62, 66 of both systems 56, 58 are axially joined together and thus, have the same angular velocity and must orbit about the center of the transmission 54 at the same angular velocity. The input sun roller gear 60 drives the input roller gear planets 62 which, in turn, react against the ground ring roller gear 64 by rotating at some angular velocity and orbiting about the center of transmission 54 at some orbital angular velocity. Thus, the orbital angular velocity and the rotational angular velocity for the planets 62, 66 are set. However, the output roller gear planets 66 have a different tooth pitch diameter than the input roller gear planets 62. Thus, the output ring roller gear 70 has a different speed than the ground ring roller gear 64 and the transmission 54 exhibits speed reduction. The output roller gear sun 68 is in place primarily to provide strength and rigidity to transmission 54, keeping the output system 58 together with strength and precision just as the output sun roller gear sun 68 does for input system 56. Thus, the two systems 56, 58 are independently strong and rigid and the combined system is even stronger.

We will now derive the transfer function for the transmission 54 and, in so doing obtain further understanding of how it works.

$$\omega_{OR}R_O - \omega_P R_{PO} = \omega_O R_O \tag{1}$$

$$\omega_{OR}R_O + \omega_P R_{PI} = \omega_S R_S \tag{2}$$

Where:

$\omega_{OR}$=planet angular orbital velocity.

$R_O$=transmission output radius.

$\omega_P$=planet angular velocity.

$R_{PO}$=planet output radius.

$\omega_O$=output orbital angular velocity.

$R_{PI}$=planet input radius.

$\omega_S$=sun angular velocity.

$R_S$=sun radius.

$$(R_S + 2R_{PI})\theta_{OR} = R_{PI}\theta_{PI} \tag{3}$$

Where:

$\theta_{PI}$=some arbitrary angle a planet rotates.

$\theta_{OR}$=the corresponding angle the planet orbits.

Taking the time derivative of both sides of eq. (3) we get:

$$(R_S + 2P_{PI})\delta\theta_{OR_{\delta\tau}} = R_{PI}\delta\theta_{PI_{\delta\tau}} \tag{4}$$

$$\delta\theta_{OR_{\delta\tau}} = \omega_{OR} \tag{5}$$

$$\delta\theta_{PI_{\delta\tau}} = \omega_{PI} = \omega_{PO} = \omega_P \tag{6}$$

Eqs. (4), (5) and (6) come from the basic definition of angular velocity and from the fact that a planet must have a single angular velocity for both the input and output interfaces and establish the relationship between $\omega_P$ and $\omega_{OR}$.

$$\frac{\omega_P R_{PI} R_O}{(R_S + 2R_{PI})} - \omega_P R_{PO} = \omega_O R_O \tag{7}$$

$$\frac{\omega_P R_{PI} R_S}{(R_S + 2R_{PI})} + \omega_P R_{PI} = \omega_S R_S \tag{8}$$

Esq. (7) and (8) come from substituting for $\omega_{OR}$.

$$\frac{\omega_S R_S}{\omega_O R_O} = \frac{R_{PI}R_O + R_{PI}(R_S + 2R_{PI})}{R_{PI}R_O - R_{PO}(R_S + 2R_{PI})} \tag{9}$$

$$\frac{\omega_{S-}}{\omega_O} = \frac{(R_O)[2(R_{PI})^2 + R_{PI}(R_O + R_S)]}{R_S[R_{PI}R_O - R_{PO}(R_S + 2R_{PI})]} \quad (10)$$

$$\frac{\omega_S}{\omega_O} = \frac{(R_O)[2(R_{PI})^2 + R_{PI}(R_O + R_S)]}{R_S[R_{PI}(R_O - 2R_{PO}) - R_{PO}R_S]} \quad (11)$$

Eq. (11) comes from rearranging terms in eqs. (9), (10).

$$\frac{T_O}{T_I} = \propto \frac{\omega_S}{\omega_O} \quad (12)$$

Eq. (12) states conservation of energy.
Let:

$\propto = 85\%$ $R_{PI} = R_S = 0.25$ in.

$R_{PO} - R_{PI} = 0.020$ in.

Since:

$R_O = R_S + R_{PI} + R_{PO}$ $R_O = 0.770$ in.

So:

$\frac{\omega_S}{\omega_O} = -117$ $\frac{T_O}{T_I} = -99.5 \, (SAY - 100)$

An estimate that the transmission can withstand 60 ft-lb output torque is derived as follows:

The largest stress will be on the planet teeth that push off against the ground ring roller gear 64. This is because the lower planet radius is slightly smaller than the upper planet radius and because it will take slightly more load. Assuming 20 teeth in the planet.

$$\frac{1.024945E3 \text{ lbs} (.770 \text{ in.})}{12 \text{ in./ft.}} = 65 \text{ ft./lbs.}$$

Where:
L=length of teeth that can resist shear=0.25 in.
58E3=yield strength of material with 2:1 safety factor.
0.6=shear factor.
40=20 teeth+20 spaces between teeth.
With 3 planets we get 1.024945E3 lbs.=F. And $$\frac{(\pi 2R_{PI}L)58E3(.6)(.25 \text{ in.})}{40} = \text{max allowable shear load per tooth}$$

$$= 342 \text{ lbs.}$$

Assembly of transmission 54 will now be discussed. To assemble transmission 54, the roller portions of the planets 62, 66 are positioned in output ring roller gear 70. The roller of input sun roller gear 60 is then positioned in the arrangement. The other planet gear teeth cylinders 72 are then tightly fit over each of the bottom roller portions of the planets 62, 66 and, at the same time, meshed with the teeth of the output ring roller gear 70. The input sun roller gear teeth cylinder 73 is then tightly fit over the roller of the input sun roller gear 60, meshed with the teeth of the planets 62, 66 and fastened in place with an assembly screw. The ground ring roller gear 64 is then slipped in place, its teeth meshing with the teeth of the planets 62, 66 as it goes. Next, input sun roller gear 60 is slipped into place, its teeth meshing with those of the planets 62, 66 as it goes. The three bottom portions of the planet rollers are each then fit tightly into their respective planet gear teeth cylinders and splined into the roller portion of the planet already in place. Then, each of the planets 62, 66 is finalized in its assembly with a fastening screw. The entire transmission 54 is now assembled, aligned and ready to function.

Disassembly is accomplished by reversing the steps. It should be noted that if the output roller gear sun 68 can be manufactured in a single piece, and the assembly/disassembly process can proceed, essentially unchanged.

Referring to FIG. 10, we see a sectional view of a planetary transmission 82 using phase-shifted gear bearings. The phase shifted gear bearing transmission 82 has a similar structure to roller gear bearing transmission 54. However, the corresponding input and output sun and planet gears, as well as the ring gear, comprise phase-shifted gear bearings as opposed to roller gear bearings. The assembly/disassembly process for the phase-shifted gear bearing transmission of FIG. 10 is essentially identical to that described with respect to the transmission 54 of FIG. 9.

Figure 11:
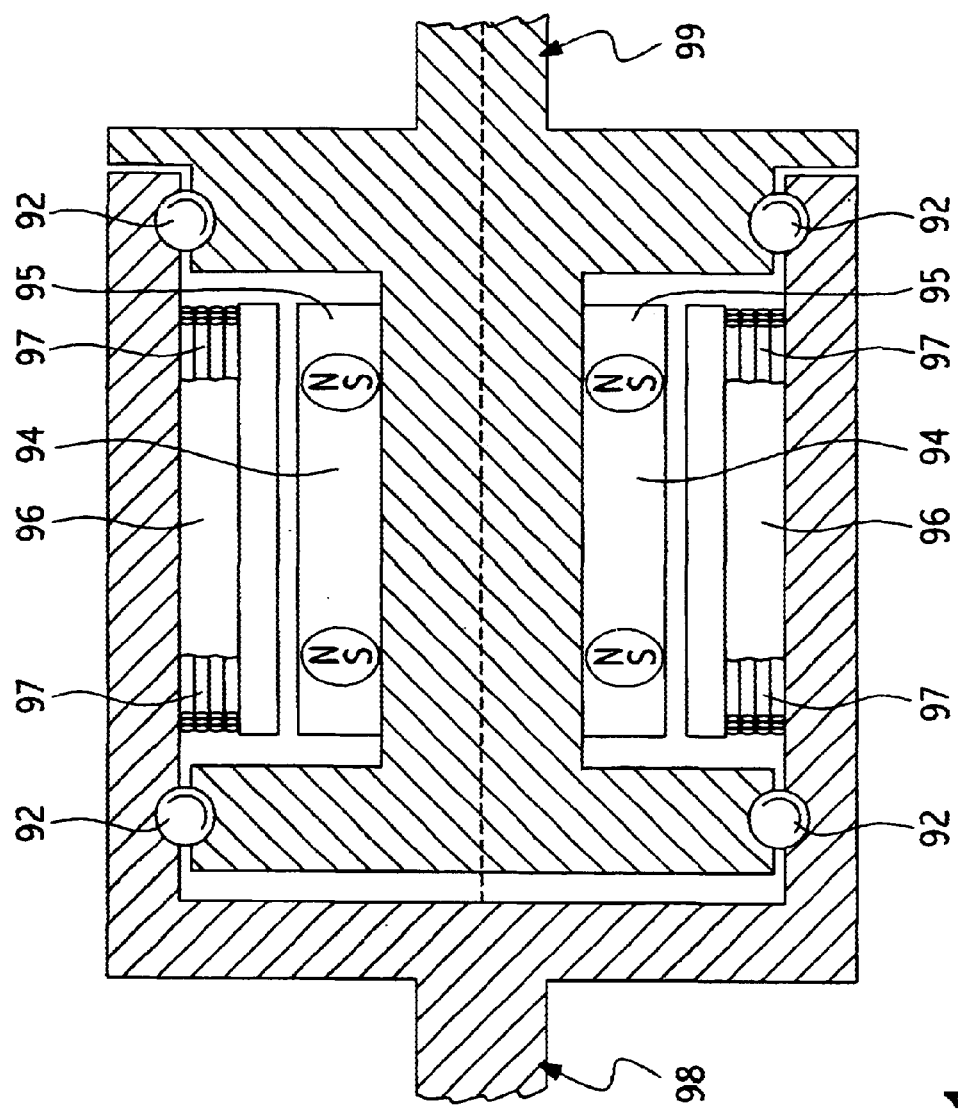
FIG. 11 is a sectional view of an existing electric motor.

The present gear bearing can also be used to improve electric motors. FIG. 11 is a sectional view of an existing electric motor 90, requiring two sets of ball bearings 92, which separate armature 94 from stator 96. The armature 94 includes permanent magnet 95, and the stator 96 includes coils 97. The ball bearings 92 also allow the armature 94 to rotate with respect to the stator 96, typically by using the weak forces of electric motors. The motor 90 further includes a motor mount screw 98, and an output drive 99.

Figure 12:
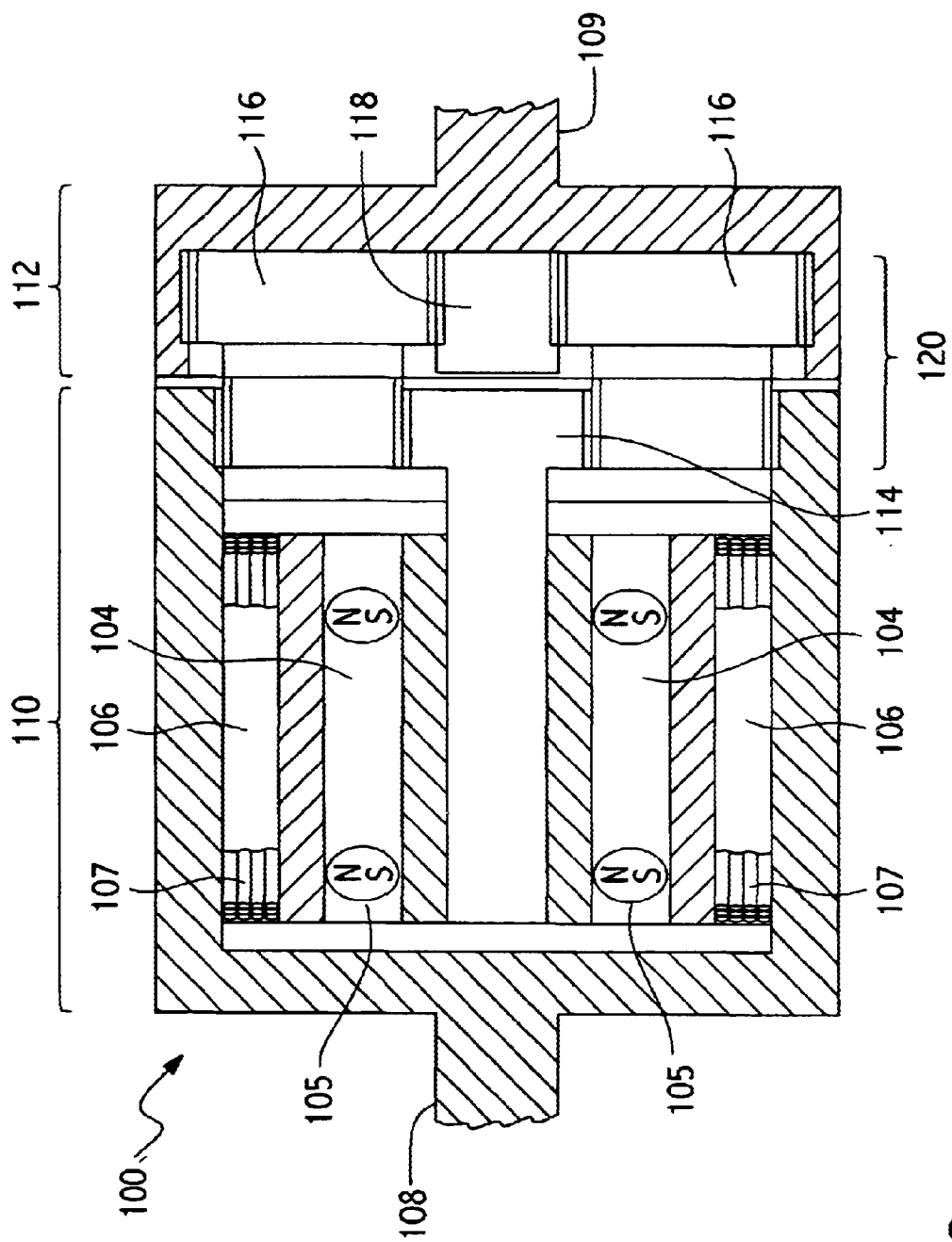
FIG. 12 is a sectional view of an electric motor including the present gear bearings.

FIG. 12 is a sectional view of an electric motor 100 using the gear bearings of the present invention. Motor 100 is similar to the existing motor design in that it includes armature 104, including permanent magnets 105, stator 106, including coils 107, and motor mount screw 108. These elements form a housing 110. Motor 100 also comprises an output 112, including an output screw 109.

Instead of using ball bearings, motor 100 has sun gear bearing 114, a gear bearing transmission 120, comprising a sun gear bearing which drives plant gear bearings 116, which in turn drive the output 112. An idler 118 acts as a stiffener and is placed between planet gear bearings 116.

The gear bearing transmission 120 results in a smaller, simpler design, that is easier to assemble as compared to the existing ball bearing design.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A gear bearing system comprising:
   a first gear bearing having a first roll surface element with a first roll surface element radius, a first gear coaxially positioned with said first roll surface element, said first gear having a plurality of first gear teeth, each of said gear teeth having a first and second surface with corresponding first and second contact points and a first pitch radius such that said first gear tooth pitch radius is substantially equal to said first roll surface element radius; and, a second gear bearing having a second roll surface element with a second roll surface element radius, a second gear coaxially positioned with said second roll surface element, said second gear operating on said first and said second surface of said first gear teeth.

2. The gear bearing system of claim 1, said second gear teeth having a first surface with a first contact point and a second surface with a second contact point wherein said first and second surfaces are non-parallel.

3. The gear bearing system of claim 2, with said first surface of said first gear teeth operating as a bearing, said second surface of said first gear teeth operating as a gear drive wherein said contact points on said first and said second gear teeth move at a certain speed.

4. The gear bearing system of claim 3, further comprising a ring bearing, wherein said second gear bearing operates on a first surface and a second surface of said ring bearing.

5. The gear bearing system of claim 4, further comprising a third gear bearing, said third gear bearing having a plurality of third gear teeth, each of said third gear teeth having a pitch radius, a first and a second surface with corresponding first and second contact points, said third gear teeth operating on said contact points of said first surface and said second surface of said first gear teeth.

6. The gear bearing system of claim 5, further comprising a fourth gear bearing, said fourth gear bearing having a plurality of fourth gear teeth, each of said fourth gear teeth having a pitch radius, a first and a second surface with corresponding first and second contact points, said fourth gear teeth operating on said contact points of said first surface and said second surface of said first gear teeth.

7. The gear bearing system of claim 6, wherein said first gear bearing is a sun gear bearing, and said second, third, and fourth gear bearings are planet gear bearings.

8. The gear bearing system of claim 7, wherein said gear bearing system is self-supporting.

9. The gear bearing system of claim 1, wherein each of said first gear teeth includes a first gear teeth crown with a first gear teeth crown radius, said first gear teeth crown radius is substantially equal to said first roll surface element radius.

10. The gear bearing system of claim 1, wherein said first roll surface element is a roller.

11. A gear bearing system comprising:

a first gear bearing having a first roll surface element with a first roll surface element radius, a first gear coaxially positioned with said first roll surface element, said first gear having a plurality of first gear teeth, each of said first gear teeth having a first gear teeth pitch radius such that said first gear teeth pitch radius is substantially equal to said first roll surface element radius, each of said gear teeth having a first and second surface with corresponding first and second contact points and each of said first gear teeth having a first gear teeth crown with a first gear teeth crown radius, said first gear teeth crown radius said substantially equal to said first gear roll surface element radius; and a second gear bearing having a second roll surface element with a second roll surface element radius, a second gear coaxially positioned with said second roll surface element, said second gear having a plurality of second gear teeth operating on said first and said second surface of said first gear teeth, each of said second gear teeth having a second gear teeth pitch radius such that said second gear teeth pitch radius is substantially equal to said second roll surface element radius, and each of said second gear teeth having a second gear teeth crown with a second gear teeth crown radius, said second gear teeth crown radius is substantially equal to said second gear roll surface element radius.

12. The gear bearing system of claim 11, further comprising a third gear bearing, said third gear bearing having a plurality of third gear teeth, each of said third gear teeth having a pitch radius, a first and a second surface with corresponding first and second contact points, said third gear teeth operating on said contact points of said first surface and said second surface of said first gear teeth.

13. The gear bearing system of claim 12, further comprising a fourth gear bearing, said fourth gear bearing having a plurality of fourth gear teeth, each of said fourth gear teeth having a pitch radius, a first and a second surface with corresponding first and second contact points, said fourth gear teeth operating on said contact points of said first surface and said second surface of said first gear teeth.

14. The gear bearing system of claim 13, further comprising a ring gear having a plurality of ring gear teeth operating on said first and second surfaces of said second gear.

* * * * *